UNITED STATES PATENT OFFICE.

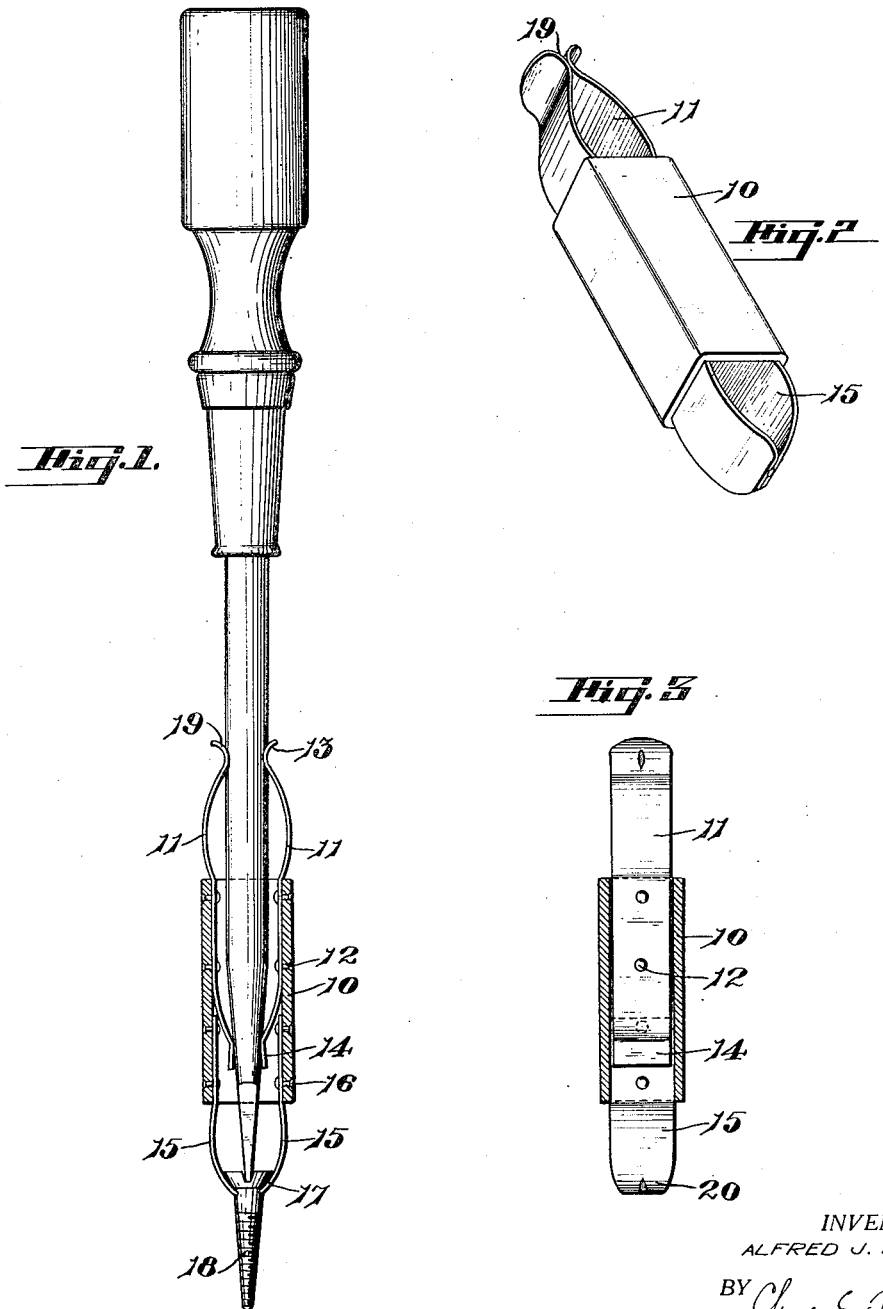

ALFRED J. REID, OF SAN FRANCISCO, CALIFORNIA, ASSIGNOR OF ONE-HALF TO PETER M. SAVAGE, OF SAN FRANCISCO, CALIFORNIA.

HOLDER FOR SCREWS, NAILS, AND THE LIKE.

1,426,320.  Specification of Letters Patent.  Patented Aug. 15, 1922.

Application filed November 28, 1921. Serial No. 518,233.

*To all whom it may concern:*

Be it known that I, ALFRED J. REID, a citizen of the United States, residing at the city and county of San Francisco and State of California, have invented new and useful Improvements in Holders for Screws, Nails, and the like, of which the following is a specification.

This invention relates to an attachment for screw drivers, punches and the like for the purpose of holding a screw, tack or bit while the latter is being driven.

The object is to simplify and improve the construction and operation of such devices. In carrying out this object I employ spring leaves arranged in a novel manner for gripping the shank of the tool at spaced points along the length of the same and separate springs forming jaws to receive and retain the screw or other object in place to be acted upon by the tool. There are no hinges or joints used in the attachment and therefore there is little likelihood of its getting out of order. I am aware that spring leaves have been used heretofore in similar attachments, but they were somewhat more expensive to construct and were incapable of fitting as many different sizes of tools as the present device. Furthermore, they did not grip the shank of the tool satisfactorily.

One form which my invention may assume is exemplified in the following description and illustrated in the accompanying drawing, in which—

Fig. 1 shows a side elevation of a screw driver with the attachment in place thereon, the latter being shown in cross section.

Fig. 2 shows a perspective view of the attachment.

Fig. 3 shows a central, longitudinal, sectional view taken at right angles to the view of Fig. 1.

In its preferred form, the device comprises a sleeve 10 of rigid material and preferably rectangular in cross section. Inside of the sleeve is arranged a pair of spring leaves 11 fastened intermediate their ends to the walls of the sleeve by rivets 12 or the like. The springs 11 at one end project beyond the sleeve and are brought together to form gripping jaws 13 for engaging the shank of a tool near the handle thereof. The opposite ends of the leaves 11 lie within the sleeve and are brought together to form gripping jaws 14 for engaging the shank or blade of the tool near the outer end thereof.

A second and separate pair of spring leaves 15 is arranged within the sleeve and fastened thereto at one end by means of rivets 16 or the like. The free ends of these leaves 15 project out from the sleeve and are turned inwardly to form jaws 17 for receiving and retaining the head of a screw 18 or the like.

The sleeve 10 is made large enough to accommodate the largest sizes of tools and the spring jaws are such as to expand the full width of the sleeve. Therefore the attachment will fit any size tool within the ordinary limits. Preferably the ends of the springs 11 adjacent the jaws 13 are bowed outwardly, as shown at 19, to facilitate the insertion of the blade of the screw driver between when applying the attachment thereto. The corners of the springs 15 adjacent the jaws 17 are rounded, as shown at 20, to permit a screw or other object to be inserted at one side.

The construction here illustrated and described is exceptionally strong and rugged and the arrangement of the spring leaves 11 affords a gripping action at spaced points along the length of the tool. When it is desired to dispense with the use of the holder temporarily it may be slipped upwardly along the blade or shank of the tool far enough to allow the point of the blade to project through the jaws 17. The screw driver or other tool can then be used in the usual way and the presence of the attachment will not interfere with the operation.

The prior devices referred to and which employ leaf springs are so constructed that separation of the jaws which receive the tool increases the pressure of the jaws which receive the screw or tack. This makes it rather difficult to insert a large screw when the attachment is fitted to a large blade or shank. By using springs for the shank which are separate from those receiving the screw or tack this objection is overcome.

Various changes in the construction and arrangement of the several parts herein shown and described may be employed without departing from the spirit of my invention as disclosed in the appended claims.

Having thus described my invention, what I claim is:

1. An attachment for tools of the type disclosed, comprising a rigid sleeve, a pair of spring leaves arranged within the sleeve and forming at their opposite ends expansible jaws to grip the tool, and a second and separate pair of spring leaves also arranged within the sleeve and projecting from one end thereof to form expansible jaws to grip a screw or the like.

2. An attachment for tools of the type disclosed, comprising a rectangular sleeve formed of rigid material, a pair of spring leaves arranged within the sleeve and connected to the walls thereof intermediate their ends, one end of each of the leaves projecting out from the sleeve and forming jaws to grip the tool near the inner end thereof and the other end of each of the leaves lying within the sleeve and forming jaws to grip the tool near the outer end thereof, and a second and separate pair of spring leaves arranged within the sleeve and secured at their inner ends to the walls thereof, said last-named springs extending out from the sleeve and forming at their free ends a pair of jaws to receive a screw or the like.

ALFRED J. REID.